United States Patent
Fukao et al.

[11] Patent Number: 5,880,550
[45] Date of Patent: *Mar. 9, 1999

[54] VARIABLE-SPEED DYNAMOTOR

[75] Inventors: Tadashi Fukao, 24-45 Matsukazedai, Aoba-ku, Yokohama-shi, Kanagawa-ken 227; Akira Chiba, 1-8-14-707 Shimo Ochiai, Shinjuku-ku, Tokyo 161; Chikara Michioka, 2-8-21-909 Hatanodai, Shinagawa-ku, Tokyo 142, all of Japan

[73] Assignees: Tadashi Fukao, Kanagawa; Akira Chiba; Chikara Michioka, both of Tokyo; Seiki Co., Ltd., Chiba-ken; Nikkiso, Co., Ltd.; Ebara Corporation, both of Tokyo, all of Japan

[*] Notice: This patent issued on a continued prosecution application filed under 37 CFR 1.53(d), and is subject to the twenty year patent term provisions of 35 U.S.C. 154(a)(2).

[21] Appl. No.: 621,577

[22] Filed: Mar. 26, 1996

[30] Foreign Application Priority Data

Mar. 29, 1995 [JP] Japan ................................ 7-096234

[51] Int. Cl.⁶ .................................................. H02K 1/00
[52] U.S. Cl. ......................... 310/179; 310/211; 318/729
[58] Field of Search .................................. 310/179, 211; 318/729; 322/10

[56] References Cited

U.S. PATENT DOCUMENTS

| 4,338,557 | 7/1982 | Wanlass | 318/729 |
| 4,503,377 | 3/1985 | Kitabayashi et al. | 318/807 |
| 4,625,160 | 11/1986 | Hucker | 322/32 |
| 5,083,077 | 1/1992 | Wallace | 322/32 |
| 5,260,642 | 11/1993 | Huss | 322/51 |
| 5,291,115 | 3/1994 | Ehsani | 318/701 |
| 5,384,527 | 1/1995 | Rozman | 322/10 |

FOREIGN PATENT DOCUMENTS 193547  7/1990  Japan.

OTHER PUBLICATIONS

S. Furuya, et al., *Successful Achievement in a Variable Speed Pumped Storage Power System at Yagisawa Power Plant*, PCC-Yokohama '93, IEEE 1993, pp. 603–608.

IEEJ (Institute of Electrical Engineers of Japan) Technical Report No. 551, Jun. 1995, pp. 90–93, IEEJ.

A. Chiba, et al., *An Analysis of Bearingles AC Motors*, IEEE Transactions on Energy Conversion, vol. 9, No. 1, Mar. 1994, pp. 61–68, IEEE, Japan.

A. Chiba, et al., *Principles and No Load Characteristics of Bearingless Motors with a Cylindrical Rotor*, T. IEE Japan, vol. 113-D, No. 4, 1993, pp. 539–547.

*Primary Examiner*—Thomas M. Dougherty
*Assistant Examiner*—Timothy A. Williams
*Attorney, Agent, or Firm*—Armstrong, Westerman, Hattori, McLeland & Naughton

[57] ABSTRACT

A variable-speed dynamotor has a stator having a first set of windings that provide a number of poles for rotating a rotor and a second set of windings that provide a number of poles different from the number of poles provided by the first set of windings. Voltages or currents supplied to the second set of windings are controlled to generate radial forces acting on the rotor for thereby controlling a radial position of the rotor, suppressing vibrations of the rotor, adjusting rotational balancing of the rotor, and controlling radial damping of the rotor.

4 Claims, 6 Drawing Sheets

VARIABLE-SPEED DYNAMOTOR

BACKGROUND OF THE INVENTION

1. Field of the Invention

The present invention relates to a variable-speed dynamotor-for use as a motor-generator in an electrical power system, and more particularly to a variable-speed dynamotor including a stator which has a first set of windings that provide a number of poles for rotating a rotor and a second set of windings that provide a number of poles different from the number of poles provided by the first set of windings, for generating radial forces acting on the rotor to control the radial position of the rotor, suppress vibrations of the rotor, adjust rotational balancing of the rotor, or control the radial damping of the rotor.

2. Description of the Related Art

Variable-speed dynamotors or motor-generators for use in electric power systems have a rotor which can be rotated at a variable speed. The variable-speed dynamotor has already been put to use, and can increase the stability of the electrical power system in which it is incorporated, with the inertial energy of the rotor by varying the rotational speed of the rotor. The variable-speed dynamotor has been reported in various documents including (1) "395MVA variable-speed system for pumped power generation by Keiji Saito, IEEJ (Institute of Electrical Engineers of Japan) Transaction D. Vol. 113, No. 2, p. 267, 1993, and (2) "Variable-speed pumped generation system"by Shaku Fujimoto, Power Electronics Research Society Journal Vol. 16, pp. 16–26.

Figure 1:
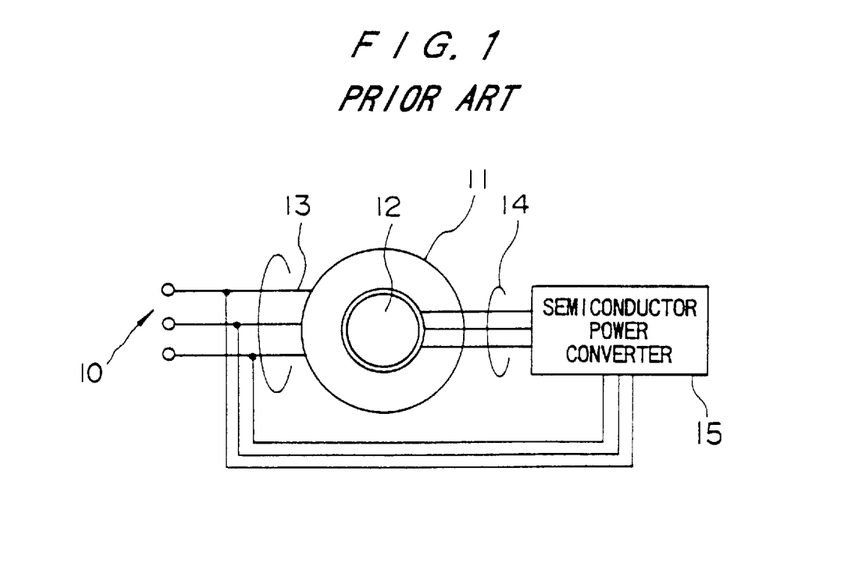
FIG. 1 is a schematic view, partly block form, of a conventional variable-speed dynamotor.

FIG. 1 of the accompanying drawings shows a conventional variable-speed dynamotor of general configuration. The variable-speed dynamotor shown in FIG. 1 has a stator 11 and a rotor 12 which are of the same structure as those of a wound-rotor induction machine. Specifically, the stator 11 has three-phase windings connected to power system terminals 10, and the rotor 12 has three-phase windings connected through slip rings to a semiconductor power converter 15. The semiconductor power converter 15 supplies variable-frequency currents to the rotor 12 depending on the rotational speed of the rotor 12, the frequency of the bus terminals of the power system, and so on. The semiconductor power converter 15 is connected to the power system terminals 10 for exchanging electrical energy with the power system terminals 10.

The rotational speed of the variable-speed dynamotor shown in FIG. 1 is variable in a very small range of about 10%. The variable-speed range cannot easily be expanded because of the limited mechanical strength of the rotor 12 and also the mechanical resonance of the rotor 12.

The mechanical resonance of the rotor 12 may be removed by improving the mechanical design of the rotor 12. However, it is a simpler approach to actively vary the damping capability and stiffness of the rotor 12 with magnetic bearings.

Magnetic bearings are disclosed in detail in a document (3) "Magnetic bearing and its related technology I. Controlled magnetic bearing and its applications" by Fumio Matsumura, IEEJ (Institute of Electrical Engineers of Japan) Transaction D. Vol. 114, pp. 1200–1207, 1994, for example.

If magnetic bearings are incorporated in a variable-speed dynamotor, then the axial length of the rotor is increased, making the mechanical system of the variable-speed dynamotor complex, and lowering the critical speed of the variable-speed dynamotor. Therefore, the controllability of the variable-speed dynamotor is reduced by the use of the magnetic bearings. It is desirable to generate radial forces on the rotor supplementally or actively without modifying the mechanical system, e.g., the length of the rotor, of the variable-speed dynamotor.

Figure 2:
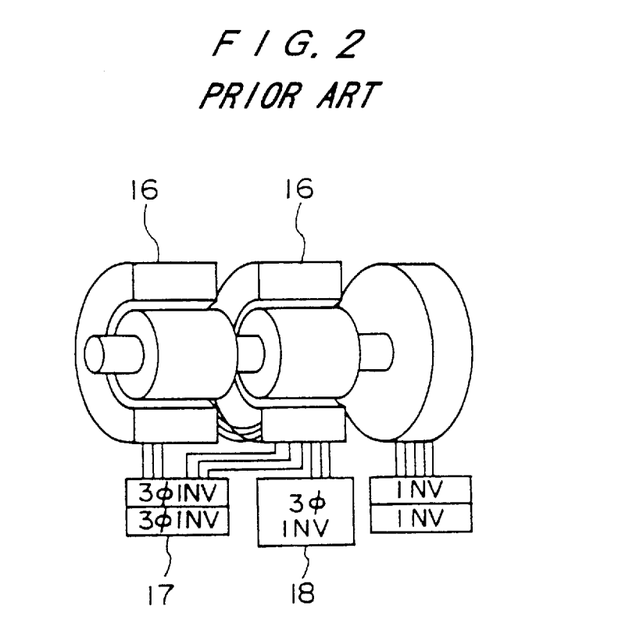
FIG. 2 is a schematic view of an ultra-high-speed rotary machine system which comprises a conventional electromagnetic rotary machine with windings for controlling the radial position of rotors.

FIG. 2 of the accompanying drawings illustrates an ultra-high-speed rotary machine system which comprises an electromagnetic rotary machine with windings for controlling the radial position of rotors, which has been proposed by the inventors of the present application. The electromagnetic rotary machine shown in FIG. 2 is disclosed in various documents including (4) "Principles of radial force generation of bearingless motors with a cylindrical rotor operating under no loads" by Akira Chiba, Kouichi Ikeda, Fukuzo Nakamura, Tazumi Deido, Tadashi Fukao, and M. A. Rahman, Electric Society Journal D. Vol. 113, No. 4, pp. 539–547, 1993, and (5) Japanese laid-open patent publication No. 2-193547. As shown in FIG. 2, the electromagnetic rotary machine has two units 16 each connected to a three-phase inverter 17 for controlling currents supplied to the windings for controlling the radial position of rotors, and also to a three-phase inverter 18 for generating a motor torque. Each of the units 16 has four-pole windings for generating a motor torque and two-pole windings for generating radial forces on the rotor. Since each of the units 16 is capable of generating a motor torque and radial forces, the electromagnetic rotary machine has a shorter shaft than general ultra-high-speed motors with magnetic bearings, and can produce a higher output power if its shaft length is the same as those of the general ultra-high-speed motors with magnetic bearings.

The electromagnetic rotary machine proposed by the inventors of the present application has the following features:

(1) The electromagnetic rotary machine, if it has three-phase windings, requires only six wire cables and two three-phase inverters for generating radial forces along two orthogonal axes and a motor torque.

(2) Because the windings for generating the radial forces and the windings for generating the motor torque are separate from each other, the inverter or power amplifier for controlling the radial forces may be of a relatively small power requirement.

(3) Inasmuch as the electromagnetic rotary machine employs the four-pole windings and the two-pole windings, if the rotors are positioned centrally within the stators, there is no mutual coupling, and no induced voltage is developed in the windings for controlling radial forces.

(4) The electromagnetic rotary machine can be used in a wide variety of high-output-power rotary machines which assume a sine-wave distribution of electromotive forces and a sine-wave distribution of magnetic fluxes, including an induction machine, a permanent-magnet synchronous machine, a synchronous reluctance motor, etc.

Figure 3:
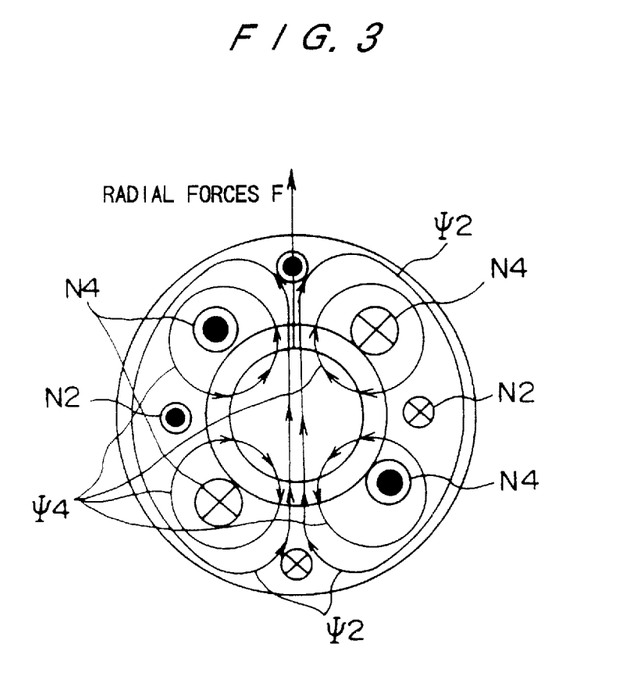
FIG. 3 is a diagram illustrative of the principles of generation of radial forces in the electromagnetic rotary machine.

FIG. 3 of the accompanying drawings illustrates the principles of generation of forces acting radially on a rotor in the electromagnetic rotary machine. As shown in FIG. 3, a stator has four-pole windings $N_4$ for producing four-pole magnetic fluxes $\Psi_4$ and two-pole windings $N_2$ for producing two-pole magnetic fluxes $\Psi_2$. The four-pole windings $N_4$ of the stator serve to generate a motor torque on the rotor. If the rotor is positioned centrally in the stator, then when a current flows through the four-pole windings $N_4$ in a positive direction, the four-pole windings $N_4$ generate four-pole symmetric magnetic fluxes $\Psi_4$.

When a two-phase alternating current is supplied to the four-pole windings $N_4$ and four-pole windings perpendicular thereto, a four-pole revolving magnetic field is generated. The stator may alternatively have three-phase windings. If the rotor has a squirrel-cage type winding, then it generates a torque due to the revolving magnetic field, with the assembly operating as an ordinary squirrel-cage type induction machine. If the rotor has four-pole permanent magnets, then it generates a torque due to the revolving magnetic field, with the assembly operating as an ordinary permanent-magnet motor.

The two-pole windings $N_2$ of the stator serve to produce forces acting radially on the rotor. When a current flows through the two-pole windings $N_2$ in a positive direction, they generate two-pole magnetic fluxes $\Psi_2$ as shown in FIG. 3. Across a gap below the rotor as shown in FIG. 3, the four-pole magnetic fluxes $\Psi_4$ and the two-pole magnetic fluxes $\Psi_2$ flow in opposite directions. Therefore, the flux density is relatively high across the gap below the rotor. Across a gap above the rotor as shown in FIG. 3, the four-pole magnetic fluxes $\Psi_4$ and the two-pole magnetic fluxes 2 flow in the same direction. Consequently, the flux density is relatively high across the gap above the rotor.

When the magnetic fluxes are brought out of equilibrium as shown, the rotor is subjected to radial forces F which are directly upwardly in FIG. 3. The magnitude of the radial forces F can be adjusted by controlling the magnitude of the current flowing through the two-pole windings $N_2$. To reverse the direction of the radial forces F, the direction of the current flowing through the two-pole windings $N_2$ may be reversed.

In order to generate radial forces horizontally across the rotor in FIG. 3, two-pole windings may be provided on the stator which are directed perpendicularly to the two-pole windings $N_2$, and a current flowing through the two-pole windings may be adjusted in magnitude and direction. By thus adjusting the magnitude and direction of the currents flowing through these two-pole windings, it is possible to generate radial forces of desired magnitudes and directions.

In FIG. 3, the four-pole windings $N_4$ are used to rotate the rotor and the two-pole windings $N_2$ are used to control the radial position of the rotor. However, it is possible to use the four-pole windings $N_4$ to control the radial position of the rotor and the two-pole windings $N_2$ to rotate the rotor.

As far as the inventors know, there has been no report whatsoever on a system for applying such an electromagnetic rotary machine to a large-power-rating variable-speed dynamotor.

SUMMARY OF THE INVENTION

It is therefore an object of the present invention to provide a variable-speed dynamotor which is free from various conventional problems including mechanical resonance and which can operate in a wide range of rotational speeds.

According to the present invention, there is provided a variable-speed dynamotor comprising a rotor, a stator having a first set of windings that provide a number of poles for rotating the rotor and a second set of windings that provide a number of poles different from the number of poles provided by the first set of windings, and control means for controlling voltages or currents supplied to the second set of windings to generate radial forces acting on the rotor for thereby controlling a radial position of the rotor, suppressing vibrations of the rotor, adjusting rotational balancing of the rotor, and controlling radial damping of the rotor.

The first set of windings may comprise two-pole windings, and the second set of winding may comprise four-pole windings. Alternatively, the first set of windings may comprise four-pole windings, and the second set of windings may comprise two-pole windings.

The variable-speed dynamotor may further comprise a sensor for detecting the radial position of the rotor, the control means comprising a controller responsive to an output signal from the sensor for generating a current command to produce the radial forces, and means responsive to the current command from the controller for supplying currents corresponding to the current command to the second set of windings.

Alternatively, the variable-speed dynamotor may further comprise a rotor position detector for detecting voltages and currents of the second set of windings and estimating the radial position of the rotor from the detected voltages and currents, the control means comprising a controller responsive to an output signal from the rotor position detector for generating a current command to produce the radial forces, and means responsive to the current command from the controller for supplying currents corresponding to the current command to the second set of windings.

The current command can be substituted by voltage command. In this case, the current supply can be replaced by voltage supply. It is also possible that voltage and current are combined together with a certain relationship. Physically, variable impedance circuits with passive or active components can be connected at the terminals of second set of windings.

The variable-speed dynamotor according to the present invention does not require the machine to be structurally modified, but only needs an additional set of windings, which provides a different number of poles from the number of poles provided by the existing set of windings for rotating the rotor, for producing radial forces acting on the rotor. The radial forces are controlled to control the radial position of the rotor, suppress vibrations of the rotor, adjust rotational balancing of the rotor, or control the radial damping of the rotor. The rotor is free from resonance, and the variable-speed dynamotor is allowed to operate stably in a wide range of rotational speeds from ultra-high speed to low speed, which is much wider than the speed range of conventional variable-speed dynamotors.

Since the rotor of the variable-speed dynamotor is of a winding structure which is the same as that of a wound-rotor induction machine, any rotational loss of the variable-speed dynamotor is not increased by currents flowing through the additional second set of windings. Furthermore, inasmuch as the transfer function with respect to the radial forces and the currents flowing through the additional second set of windings does not suffer any phase delay, any power loss of the variable-speed dynamotor is reduced, and the variable-speed dynamotor has improved characteristics.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 4:
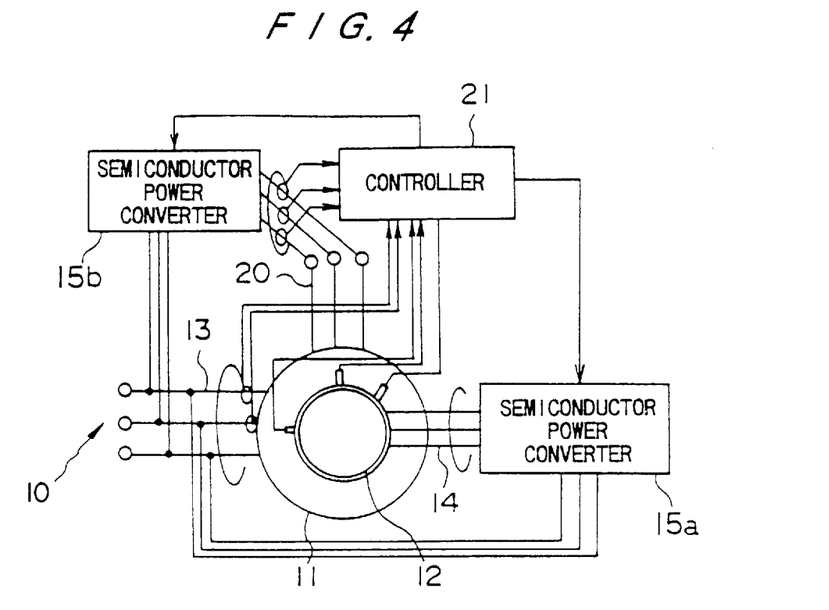
FIG. 4 is a schematic view, partly block form, of a variable-speed dynamotor for use in a power station according to an embodiment of the present invention.

As shown in FIG. 4, a variable-speed dynamotor for use in a power station according to an embodiment of the present invention includes a stator 11 having a set of main windings 13 for supplying generated electric energy or being supplied with electric energy for energizing a motor, the main windings 13 being connected to power system terminals 10 The main windings 13 will hereinafter referred to as "generator windings". The variable-speed dynamotor also includes a rotor 12 whose windings are connected to a semiconductor power converter 15a which is connected to the power system terminals 10.

The stator 11 also has another set of control windings 20 for controlling the radial position of the rotor 12. The control windings 20 provide a number of poles different from the number of poles provided by the generator windings 13. When currents are supplied to the control windings 20, the stator 11 generates radial forces acting on the rotor 12 to control the radial position of the rotor 12 within the stator 11, adjust the transfer function of a system for damping the rotor 12, and correct the rotor 12 out of an unbalanced condition.

If the generator windings 13 provide four poles, then the control windings 20 provide two poles. Conversely, if the generating windings 13 provide two poles, then the control windings 20 provide four poles. The combination of the poles provided by the generator windings 13 and the poles provided by the control windings 20 allows the generator windings 13 to generate three-phase alternating-current electric energy, and also allows the stator 11 to generate radial forces which provide magnetic bearings for supporting the rotor 12 out of contact with the stator 11. The control windings 20 may comprise three-phase windings or two-phase windings.

To permit a variable-speed dynamotor to have a wide variable-speed range, it has heretofore been practiced to connect the dynamotor to power system terminals 10 through an inverter for converting the frequency of electric energy supplied from the power system terminals 10. With such a conventional arrangement, if the variable-speed dynamotor has a very large power rating, then the semiconductor power converter used also of has a very large power rating. According to the embodiment shown in FIG. 4, the generator windings 13 are connected directly to the power system terminals 10, not through any semiconductor power converter.

The variable-speed dynamotor shown in FIG. 4 has another semiconductor power converter 15b for supplying currents to the control windings 20, and a controller 21 for issuing a current command to control the currents supplied to the control windings 20 depending on the frequency of the power system terminals 10, the rotational speed of the rotor 12, or the currents flowing through the windings of the rotor 12.

The controller 21 detects a radial displacement of the rotor 12 with a radial displacement sensor, and applies a current command depending on the detected radial displacement to the semiconductor power converter 15b to supply currents to the control windings 20 for generating radial forces to radially displace the rotor 12 to a radial position corresponding to the current command. In this manner, the radial position of the rotor 12 is controlled.

The damping capability of the rotor 12 can be adjusted to prevent mechanical resonance thereof by adjusting the frequency characteristics of the controller 21 as with conventional magnetic bearings.

If only the rotor 12 is to be corrected out of an unbalanced condition which has occurred when the rotor 12 has been manufactured, then the controller 21 estimates the magnitude and direction of the unbalanced condition from the output signal from the radial displacement sensor, generates a current command to produce radial forces to cancel out the unbalanced condition, and applies the current command in a feed-forward control configuration for eliminating periodic fluctuations of the rotor 12 without varying the damping capability of the rotor 12.

Figure 5:
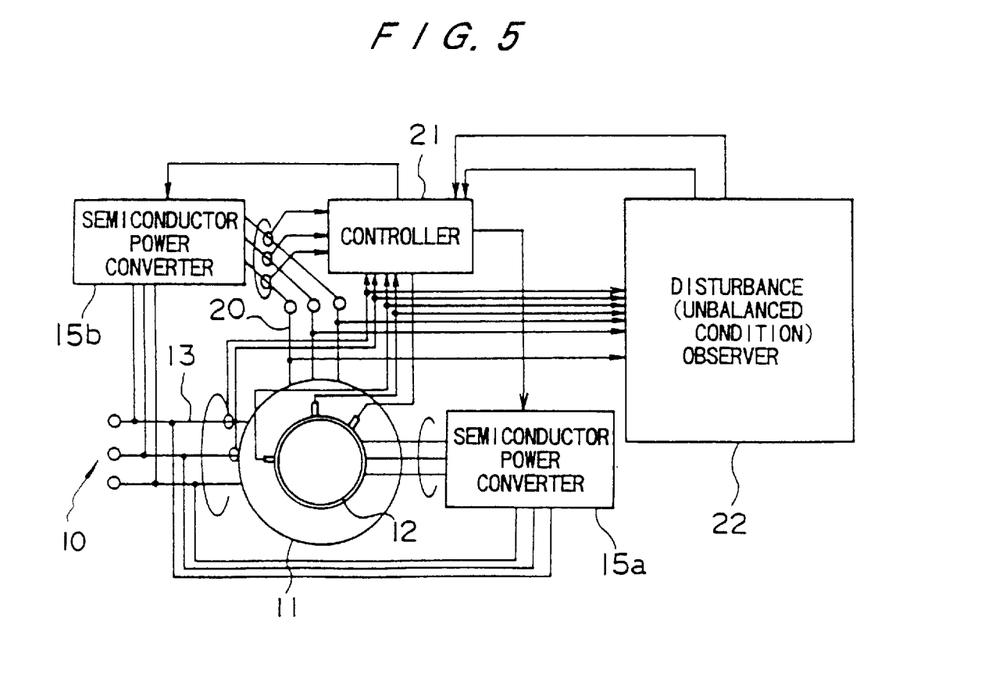
FIG. 5 is a schematic view, partly block form, of an arrangement capable of adjusting the balance of a rotor.

FIG. 5 shows an arrangement capable of adjusting the balance of the rotor 12 with a disturbance (unbalanced condition) observer 22 for estimating an unbalanced condition of the rotor 12. The disturbance observer 22 analyzes the displacement of the rotor 12 detected by the radial displacement sensor and information indicative of an angular frequency ω of the rotor 12 or the like, and detects an unbalanced condition of the angular frequency ω. Based on the detected unbalanced condition, the controller 21 controls currents flowing through the control windings 20 to generate radial forces to compensate for the unbalanced condition of the rotor 12. The rotor 12 is now adjusted out of the unbalanced condition, and can rotate about its own axis without any eccentric motion.

Figure 6:
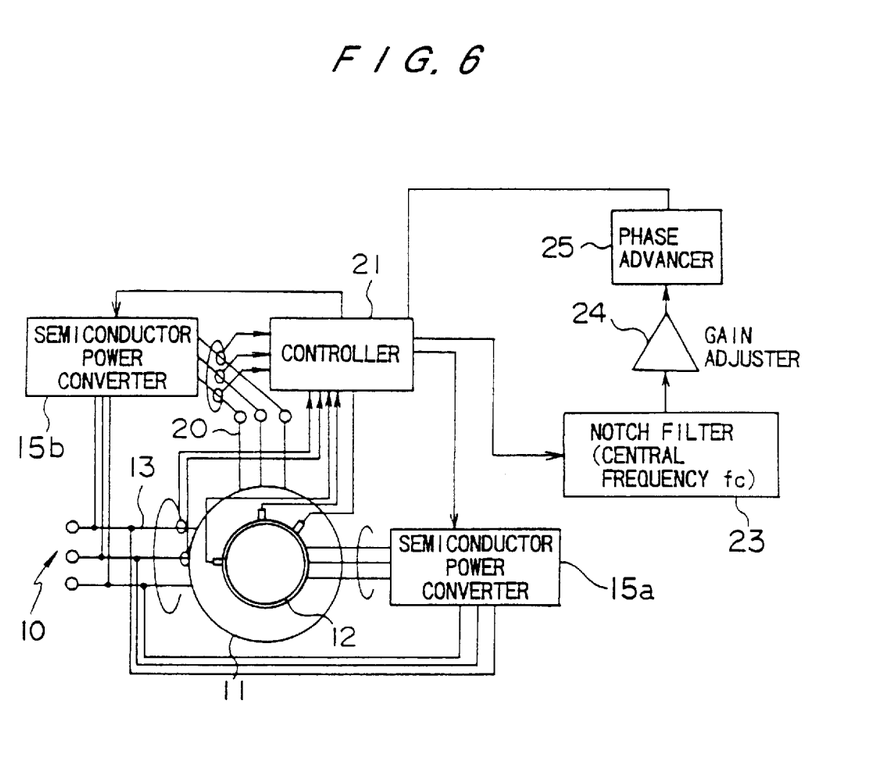
FIG. 6 is a schematic view, partly block form, of an arrangement capable of radially damping the rotor.

FIG. 6 shows an arrangement capable of radially damping the rotor 12. The controller 21 has a sensor amplifier which amplifies a radial position signal detected by the radial displacement sensor, and a compensating circuit which effects phase compensation on the amplified signal from the sensor amplifier. Based on the compensated signal, the controller 21 adjusts currents supplied to the control windings 20 to apply radial forces on the rotor 12 to keep the rotor 12 in a desired target position.

The arrangement shown in FIG. 6 has a control loop comprising a notch filter 23, a gain adjuster 24, and a phase advancer 25, the control loop being connected to the controller 21. The control loop is effective to damp the rotor 12 against resonance thereof. In order for the variable-speed dynamotor to operate over a wide speed range, it is important to effect damping control on the rotor 12 because of the natural frequency of the rotor 12 or the entire mechanical system including the stator 11 and the rotor 12.

In the arrangement shown in FIG. 6, the notch filter 23 has a central frequency fc set to the natural frequency of an object to be damped, e.g., the rotor 12. The notch filter 23 extracts a signal component of the frequency fc, and the gain adjuster 24 amplifies the signal component to adjust its gain. Then, the phase advancer 25 advances the phase of the amplified signal component. The advanced-phase signal component from the phase advancer 25 is added to the output signal from the radial displacement sensor by the controller 21. With the arrangement shown in FIG. 6, the controller 21 keeps the rotor 12 in the target position in the normal variable-speed range of the variable-speed dynamotor, and the control loop connected to the controller 21 enables the controller 21 to apply damping forces to attenuate undesirable vibrations of the rotor 12 when it resonates at the frequency fc.

Figure 7:
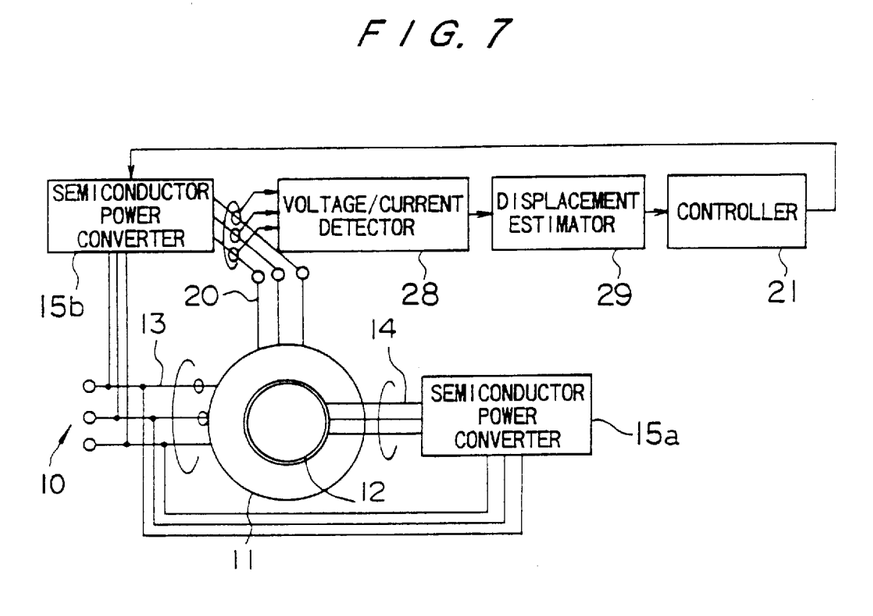
FIG. 7 is a schematic view, partly block form, of an arrangement capable of estimating a radial displacement of the rotor.
Figure 8:
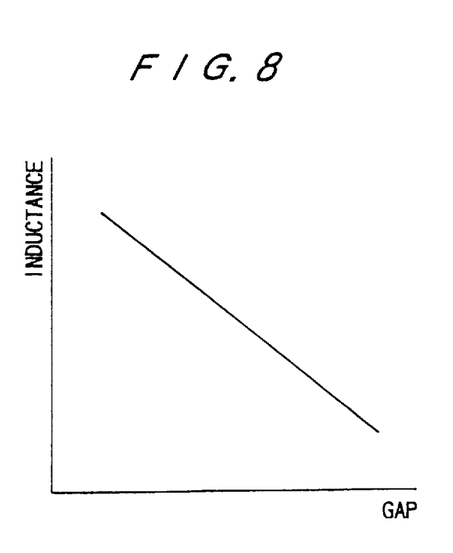
FIG. 8 is a graph showing the relationship between the inductance of windings for controlling the radial position of a stator and the gap between the stator and the rotor.

FIG. 7 shows an arrangement capable of estimating a radial displacement of the rotor 12 by detecting currents flowing through the control windings 20. A radial displacement of the rotor 12, i.e., a gap between the stator 11 and the rotor 12, can be detected when a change in the inductance of the stator 11 is detected. Specifically, the shaft of the rotor 12 or the circumferential portion of the rotor 12 is generally made of a magnetic material. When the gap between the stator 11 and the rotor 12 varies, the inductance of the stator 11 as seen from the control windings 20 also varies as shown in FIG. 8. The mutual couplings between the motor windings and control windings are almost proportional to the rotor displacements. If the displacements in radial coordinates are represented by x and y, the mutual couplings can be transformed from three phase system to two phase coordinates by conventional three phase to two phase transform matrix. Then, the mutual couplings can be expressed by 2-by-2 matrix with linear expression of x and y. The inverse matrix can be used to calculate displacements x and y from the inductance values. The arrangement shown in FIG. 7 has a voltage/current detector 28 for detecting voltages and currents of the control windings 20, and a displacement estimator 29 for estimating a radial position of the rotor 12 based on an output signal from the voltage/current detector 28. Based on the estimated radial position, the controller 21 generates a current command for producing radial forces on the rotor 12. With the arrangement shown in FIG. 7, it is necessary to measure beforehand the relationship between the gap between the stator 11 and the rotor 12, i.e., the radial displacement of the rotor 12, and the inductance of the stator 11 as seen from the control windings 20, and store data representative of the measured relationship in the displacement estimator 29.

Figure 9:
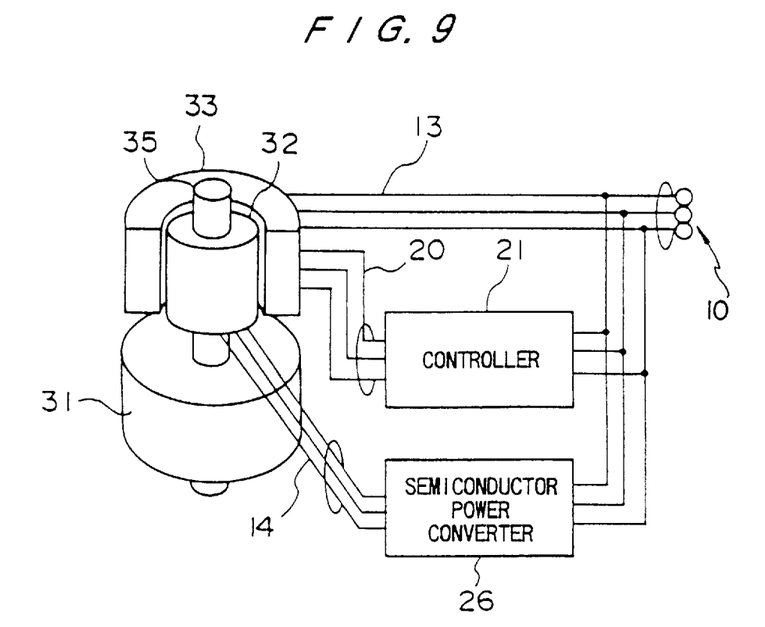
FIG. 9 is a schematic view, partly block form, of a variable-speed pumped dynamotor for use in a hydroelectric power station according to another embodiment of the present invention.

FIG. 9 shows a variable-speed pumped dynamotor for use in a hydroelectric power station according to another embodiment of the present invention. As shown in FIG. 9, the variable-speed pumped dynamotor has a rotatable shaft 35 supporting an impeller 31 on a lower portion thereof and a rotor 32 on an upper portion thereof. When the variable-speed pumped dynamotor operates as a generator, the impeller 31 is rotated by a water flow to rotate the rotor 32. When the variable-speed pumped dynamotor operates to pump water, the impeller 31 functions as a pump impeller to pump water. The rotor 32 has windings 14 connected through slip rings to a semiconductor power converter 26 which is connected to power system terminals 10. The variable-speed pumped dynamotor also includes a stator 33 having two-pole main windings 13 connected to the power system terminals and four-pole control windings 20 connected to a controller 21. If the main windings 13 provide four poles, then the control windings 20 provide two poles.

When the variable-speed pumped dynamotor is to operate as a motor, the semiconductor power converter 26, which serves to control the output power and speed of the motor, generates electrical energy under a desired voltage at a desired frequency, and supplies the desired voltage and current through the slip rings to the windings 14 of the rotor 32 for rotating the rotor 32 at a desired speed.

When the variable-speed pumped dynamotor is to operate as a generator, the semiconductor power converter 26 similarly generates electric energy under a desired voltage at a desired frequency, and supplies the desired voltage and current through the slip rings to the windings 14 of the rotor 32 for generating and supplying electric energy under a desired voltage at a desired frequency to the power system terminals 10 regardless of the rotational speed of the shaft 35.

A lower end of the shaft 35 is supported by mechanical radial and thrust bearings, and an upper end of the shaft 35 is supported out of contact with other components by a radial magnetic bearing under radial electromagnetic forces acting between the stator 33 and the rotor 32. The radial electromagnetic forces are generated by currents flowing through the main windings 13 and the control windings 20 which provide different numbers of poles. The radial magnetic bearing provided by the radial electromagnetic forces thus generated perform various functions referred to above in the preceding embodiment under the control of the controller 21. Since the upper end of the shaft 35 is supported out of contact with other components by the radial magnetic bearing and can be controlled for controlling the radial position, damping capability, balance, etc. of the rotor 32, the variable-speed dynamotor can operate stably as a motor or generator without an appreciable loss in a wide range of rotational speeds.

Figure 10:
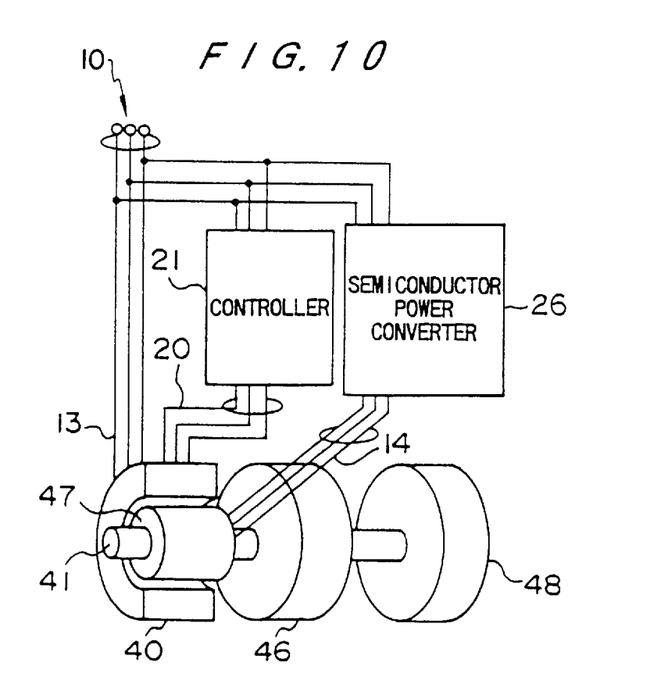
FIG. 10 is a schematic view, partly block form, of a horizontal dynamotor for use in a thermal, nuclear, or cogeneration power station according to still another embodiment of the present invention.

FIG. 10 shows a horizontal dynamotor for use in a thermal, nuclear, or cogeneration power station according to still another embodiment of the present invention. As shown in FIG. 10, the variable-speed pumped dynamotor has a rotatable shaft 41 supporting a turbine 46 at its center and a rotor 47 mounted on a left-hand end of the shaft 41 and supported by a magnetic bearing provided by a stator 40 disposed around the rotor 47. The shaft 41 has a right-hand end which may be supported by a magnetic bearing or a mechanical bearing.

The stator 40 has main windings 13 for supplying generated electrical energy or being supplied with electric energy for energizing a motor, the main windings 13 being connected to power system terminals 10. The rotor 47 has windings 14 connected through slip rings to a semiconductor power converter 26 which is connected to the power system terminals 10.

The stator 11 also has control windings 20 for controlling the radial position of the rotor 47 under the control of a controller 21. The control windings 20 provide a number of poles different from the number of poles provided by the main windings 13. If the main windings 13 provide four poles, then the control windings 20 provide two poles. Conversely, if the main windings 13 provide two poles, then the control windings 20 provide four poles.

When currents are supplied from the controller 21 to the control windings 20, they produce radial forces acting on the rotor 47 in the same manner as with the previous embodiments for controlling the radial position of the rotor 47, adjusting the transfer function of a system for damping the rotor 47, and correcting the rotor 47 out of an unbalanced condition.

The controller 21 detects a radial displacement of the rotor 47 with a radial displacement sensor, and applies a current command to supply currents to the control windings 20 for generating radial forces to radially displace the rotor 47 to a radial position corresponding to the current command. In this manner, the rotor 47 is controlled by the magnetic bearing for its radial position, rotational balancing adjustment, and radial damping.

When the variable-speed dynamotor shown in FIG. 10 operates as a generator, the turbine 46 rotates the shaft 41 at high speed, and the semiconductor power converter 26 converts electrical energy from the power system terminals 10 into electrical energy at a suitable voltage and frequency, and supplies the converted electrical power through the slip rings to the windings 14 of the rotor 47. When the rotor 47 is thus energized, it generates electrical energy across the main windings 13 of the stator 40 at a frequency in synchronism with the power system terminals 10, and the generated electrical energy is supplied to the power system terminals 10. The variable-speed dynamotor operating as a generator can supply electrical energy under a desired voltage at a desired frequency in a wide range of rotational speeds. Since the rotor 47 is supported by the magnetic bearing, the variable-speed dynamotor can operate stably without any substantial loss in a wide range of rotational speeds.

The variable-speed dynamotor shown in FIG. 10 can also operate as a motor.

Although certain preferred embodiments of the present invention have been shown and described in detail, it should be understood that various changes and modifications may be made therein without departing from the scope of the appended claims.

What is claimed is:

1. A variable-speed dynamotor comprising:

a rotor having rotor windings which is connected to a first semiconductor power converter via a slip ring; and a stator having both a first set of windings that provide a number of poles and a second set of windings that provide a number of poles different from the number of poles provided by said first set of windings, said first set of windings being directly connected to power system terminals, and said second set of windings being connected to a second semiconductor power converter;

whereby said first semiconductor power converter supplies currents to said rotor windings for generating electric energy in said first set of windings in the stator under a desired voltage at a desired frequency to the power system terminals regardless of the rotational speed of said rotor; and whereby said second semiconductor power converter supplies currents to said second set of windings for generating radial forces acting on said rotor for thereby controlling a radial position of said rotor, suppressing vibrations of said rotor, adjusting rotational balancing of said rotor, and controlling radial damping of said rotor.

2. A variable-speed dynamotor according to claim 1, wherein said first set of windings comprises two-pole windings, and said second set of windings comprises four-pole windings.

3. A variable-speed dynamotor according to claim 1, wherein said first set of windings comprises four-pole windings, and said second set of windings comprises two-pole windings.

4. A variable-speed dynamotor according to claim 1, further comprising:

a rotor radial position detector for detecting voltages and currents of said second set of windings and estimating said radial position of said rotor from the detected voltages and currents.

* * * * *